(12) United States Patent
Poisson et al.

(10) Patent No.: US 9,428,162 B1
(45) Date of Patent: Aug. 30, 2016

(54) SYSTEM AND METHOD FOR BRAKE CONTROL IN RESPONSE TO LOAD CELL FAILURE

(71) Applicant: GOODRICH CORPORATION, Charlotte, NC (US)

(72) Inventors: Richard A. Poisson, Avon, CT (US); Haftay Hailu, Acton, MA (US); Michael Abbott, Shelburne, VT (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 14/716,656

(22) Filed: May 19, 2015

(51) Int. Cl.
*B60T 8/17* (2006.01)
*B64C 25/44* (2006.01)
*B60T 8/171* (2006.01)

(52) U.S. Cl.
CPC .............. *B60T 8/1703* (2013.01); *B60T 8/171* (2013.01); *B64C 25/44* (2013.01)

(58) Field of Classification Search
CPC ................................ B60T 8/171; B64C 25/44
See application file for complete search history.

(56) References Cited

U.S. PATENT DOCUMENTS

| | | | |
|---|---|---|---|
| 6,471,015 B1* | 10/2002 | Ralea ................... | B60T 8/1703 188/1.11 L |
| 7,108,107 B2 | 9/2006 | Ralea et al. | |
| 8,029,074 B2 | 10/2011 | Cahill | |
| 8,590,985 B2 | 11/2013 | Cahill | |
| 2006/0108867 A1* | 5/2006 | Ralea ....................... | B60T 1/10 303/152 |
| 2007/0235267 A1* | 10/2007 | Liebert ................... | B60T 7/108 188/1.11 L |
| 2013/0282251 A1 | 10/2013 | Cahill | |

* cited by examiner

*Primary Examiner* — Behrang Badii
*Assistant Examiner* — Daniel L Greene
(74) *Attorney, Agent, or Firm* — Snell & Wilmer L.L.P.

(57) ABSTRACT

Systems and methods of controlling a brake system are provided. The system may include the step of detecting, by a controller, a failure of a first load cell of a first electromechanical brake actuator (EBA). The method may further comprise estimating, by the controller, a force of the first EBA using a force output from a second load cell, and commanding, by the controller, the first EBA in response to the estimated force of the first EBA.

20 Claims, 5 Drawing Sheets

SYSTEM AND METHOD FOR BRAKE CONTROL IN RESPONSE TO LOAD CELL FAILURE

FIELD OF INVENTION

The present disclosure relates to braking systems, and, more specifically, to a system and method for controlling a brake system in response to load cell failure and/or faults.

BACKGROUND

Braking systems on aircraft may use electromechanical actuators to apply force to a brake stack. The electromechanical actuators may operate using a load cell to measure applied force. A closed loop control mechanism may use the measurement of applied force from the load cell. As may be experienced with other electrical components, the load cell may experience faults or failures from time to time. One brake may include multiple electromechanical actuators, each having a load cell.

When a load cell on one of the actuators fails, the actuator may no longer function properly and may be disabled. However, disabling one or more of the actuators may also reduce braking performance as closed loop control may be become degraded. For a large aircraft, the reduction in braking performance may significantly increase the stopping distance.

SUMMARY

According to various embodiments, a brake system may comprise an electromechanical brake actuator controller (EBAC) and a first electromechanical brake actuator (EBA) electrically coupled to the EBAC. The first EBA may further comprise a first load cell. A second EBA may also be electrically coupled to the EBAC with the second EBA comprising a second load cell. A tangible, non-transitory memory may be configured to communicate with a controller of at least one of the EBA or the EBAC, the tangible, non-transitory memory having instructions stored thereon that, in response to execution by the controller, cause the controller to perform operations including the steps of detecting a failure of the first load cell, estimating a force of the first EBA using a force output from the second load cell, and commanding the first EBA in response to the force output from the second load cell.

In various embodiments, the brake system may further comprise estimating, by the controller, the force of the first EBA using the second load cell and a third load cell. The controller may determine that a voltage of the first load cell is operating outside a range of a voltage of the second load cell. The controller may further receive the force output from the second load cell on a data bus and/or on a wire. A brake stack may have the first EBA and the second EBA configured to apply pressure to the brake stack. A circuit of the controller may be electrically coupled to the first EBA with the circuit comprising a position circuitry and a force circuitry. A switch may be configured to select an input of the first EBA in response to the failure of the first load cell.

According to various embodiments, a method of controlling a brake system may comprise detecting, by a controller, a failure of a first load cell of a first electromechanical brake actuator (EBA). The method may further comprise estimating, by the controller, a force of the first EBA using a force output from a second load cell, and commanding, by the controller, the first EBA in response to the estimated force of the first EBA.

In various embodiments, the method may further comprise estimating, by the controller, the force of the first EBA using the second load cell and a third load cell. The controller may determine that a voltage of the first load cell is operating outside a range of a voltage of the second load cell. The controller may also select an input of the first EBA in response to the failure of the first load cell. The method may include outputting, by the controller, a force output from the first load cell on a data bus. A switch may be flipped to select an input of the first EBA in response to the failure of the first load cell.

According to various embodiments, a non-transitory medium hay have instructions stored thereon that, in response to execution by an electromechanical brake actuator controller (EBAC), cause the controller to perform operations. The operations may comprise detecting a failure of a first load cell of a first electromechanical brake actuator (EBA), estimating a force output of the first EBA using a force output from a second load cell, and commanding the first EBA in response to the estimated force output of the first EBA.

In various embodiments, the operations may further comprise estimating the force output of the first EBA using the force output from the second load cell and a force output from a third load cell. The operations may also comprise determining that a voltage of the first load cell is operating outside a predetermined range of a voltage of the second load cell. The predetermined range may be 5% or less of the voltage of the second load cell. The operations may also include selecting an input of the first EBA in response to the failure of the first load cell.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

Figure 1:
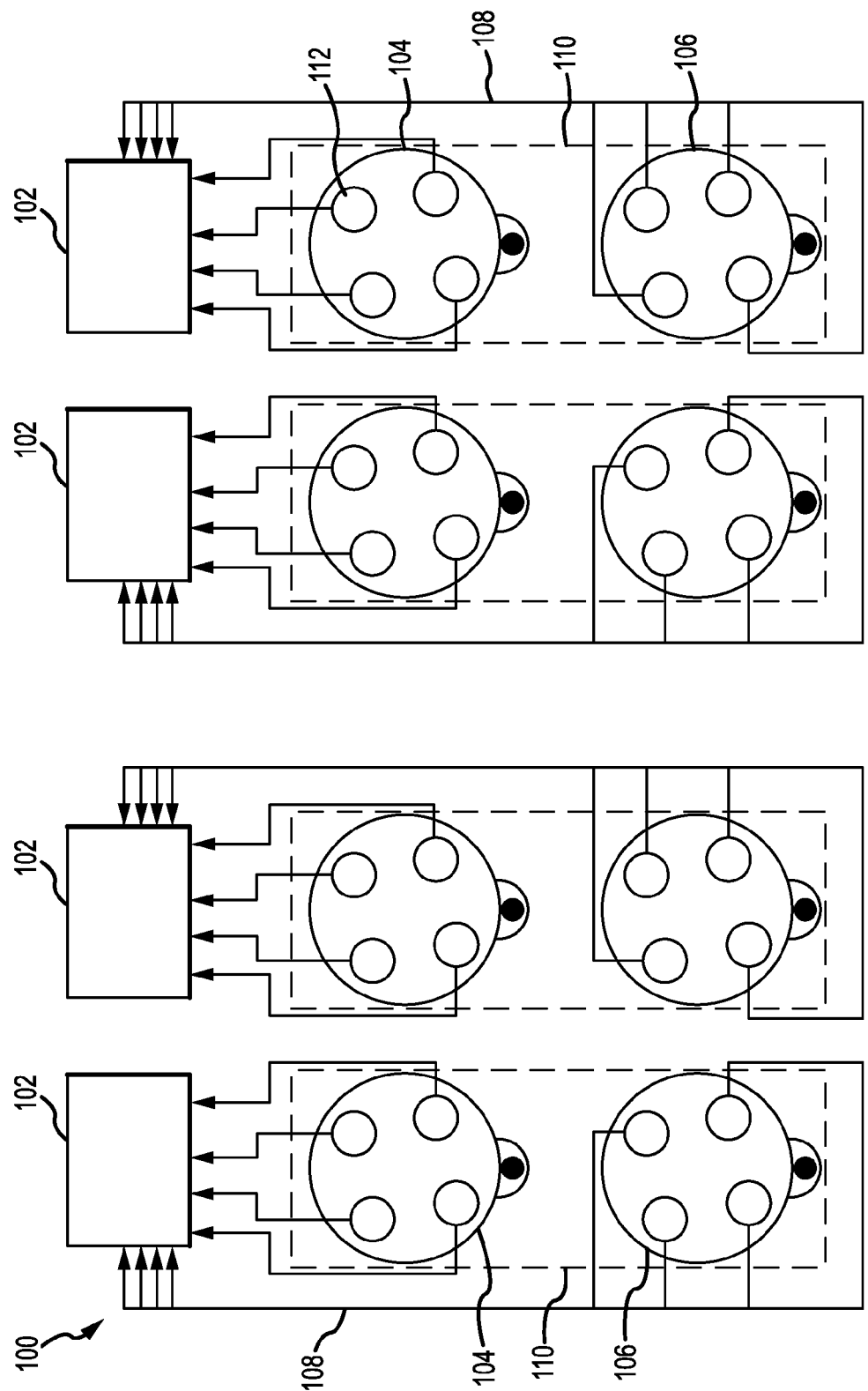
FIG. 1 illustrates an exemplary braking system with multiple brake stacks each having multiple actuators, in accordance with various embodiments.

With reference to FIG. 1, an exemplary brake system 100 is shown, in accordance with various embodiments. Brake system 100 may comprise a plurality of electromechanical brake actuator controllers (EBAC) 102. The EBACs may be electrically coupled to electromechanical actuators (EBA) 112. The EBACs may control EBAs 112 by sending a signal to each EBAs 112 indicative of a force to be applied by EBAs 112. Each brake 104 and brake 106 may include multiple EBAs 112. For example, a brake 104 may have four EBAs 112. Brake 104 may be a forward brake and brake 106 may be an aft brake with brake 104 and brake 106 forming a pair 110 in communication with the EBACs 102 through conduits 108. Conduits 108 may provide two-way communication between EBAs 112 and EBACs 102.

EBAC 102 and/or EBAs 112 may include one or more processors and one or more tangible, non-transitory memories and be capable of implementing logic (as discussed below with reference to FIGS. 4 and 5). The processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. The processor may thus be configured to implement various logical operations in response to execution of instructions, for example, instructions stored on a non-transitory, tangible, computer-readable medium. As used herein, the term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. §101.

Figure 2:
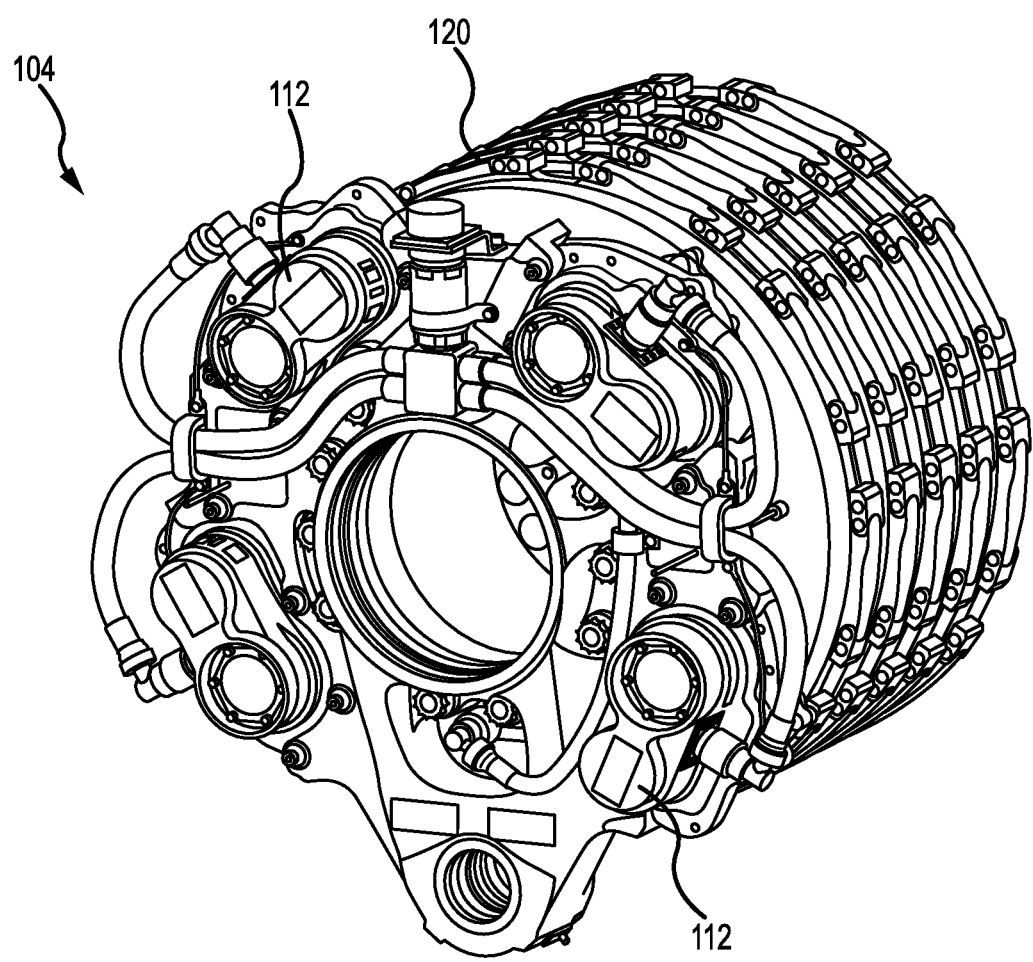
FIG. 2 illustrates an exemplary brake stack having four electromechanical brake actuators, in accordance with various embodiments.

With reference to FIG. 2, a perspective view of brake 104 is shown, in accordance with various embodiments. Brake 104 may comprise a brake stack 120 having a cylindrical geometry. EBAs 112 may be disposed at an end of brake 104. Although brake 104 is illustrated having four EBAs 112, any number of EBAs 112 may be used to apply pressure to brake stack 120. EBAs 112 may each be in electronic communication with one another in order to share load cell information, as discussed in further detail below.

Figure 3:
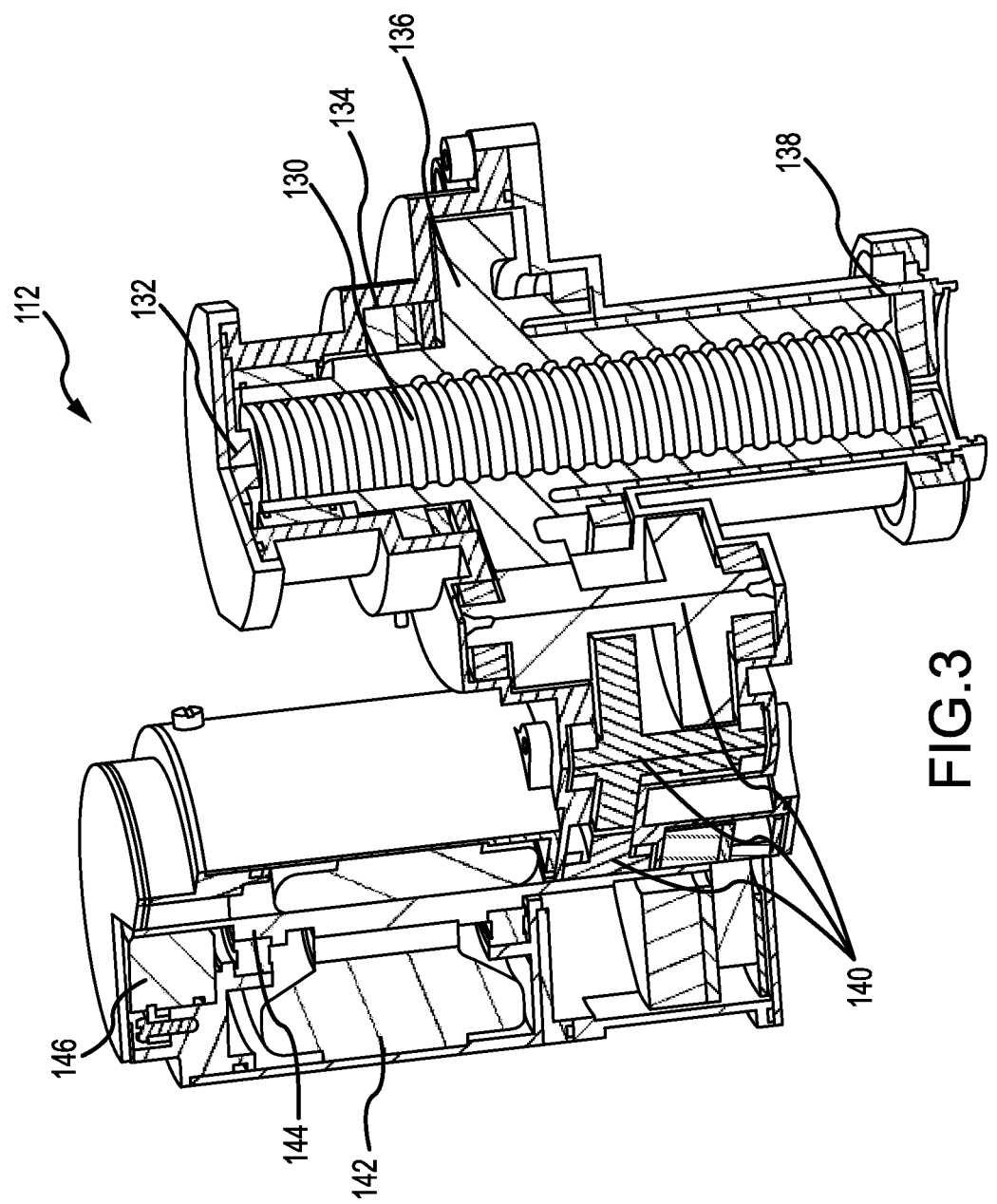
FIG. 3 illustrates a cross sectional view of an exemplary electromechanical brake actuator, in accordance with various embodiments.

With reference to FIG. 3, a cutaway view of an EBA 112 is shown, in accordance with various embodiments. EBA 112 may include a ball screw 130 and a ball nut 136. Ball nut 136 may rotate and urge ball screw 130 into a deployed or retracted position. Ball screw 130 may have a ram disposed at a distal end of ball screw 130 where the ram may be pressed outward from EBA 112 and into brake stack 120 (of FIG. 2). The ram may exert a compressive force on brake stack 120 and thus cause braking. An internal anti-rotation post 132 may stop ball screw 130 from retracting beyond the fully retracted position. A load cell 134 may be disposed in EBA 112. Load cell 134 may produce a voltage drop indicative of the force applied by ball screw 130 twisting into a deployed position. Seal 138 may seal EBA 112 at an opposite end of ball nut 136 from internal anti-rotation post 132. Gearing 140 may mechanically couple ball screw 130 and ball nut 136 to rotor assembly 144 of EBA 112. Rotor assembly 144 may rotate relative to stator assembly 142 to convert electrical energy into rotational energy. Position sensor 146 may be a resolver or a plurality of Hall Effect sensors configured to detect a position of EBA 112.

In various embodiments, each EBA 112 may have a load cell 134. Force measurements from load cell 134 may be used to operate EBA 112 during normal operation. In the event load cell 134 located locally on EBA 112 malfunctions or fails, load cells located on other EBAs may be used to operate EBA 112, as discussed below with reference to FIG. 4. In that regard, each EBA 112 may comprise circuitry to detect a failed or faulty load cell 134 located locally to EBA 112 and enable EBA 112 to operate using an external load cell located on a different EBA.

Figure 4:
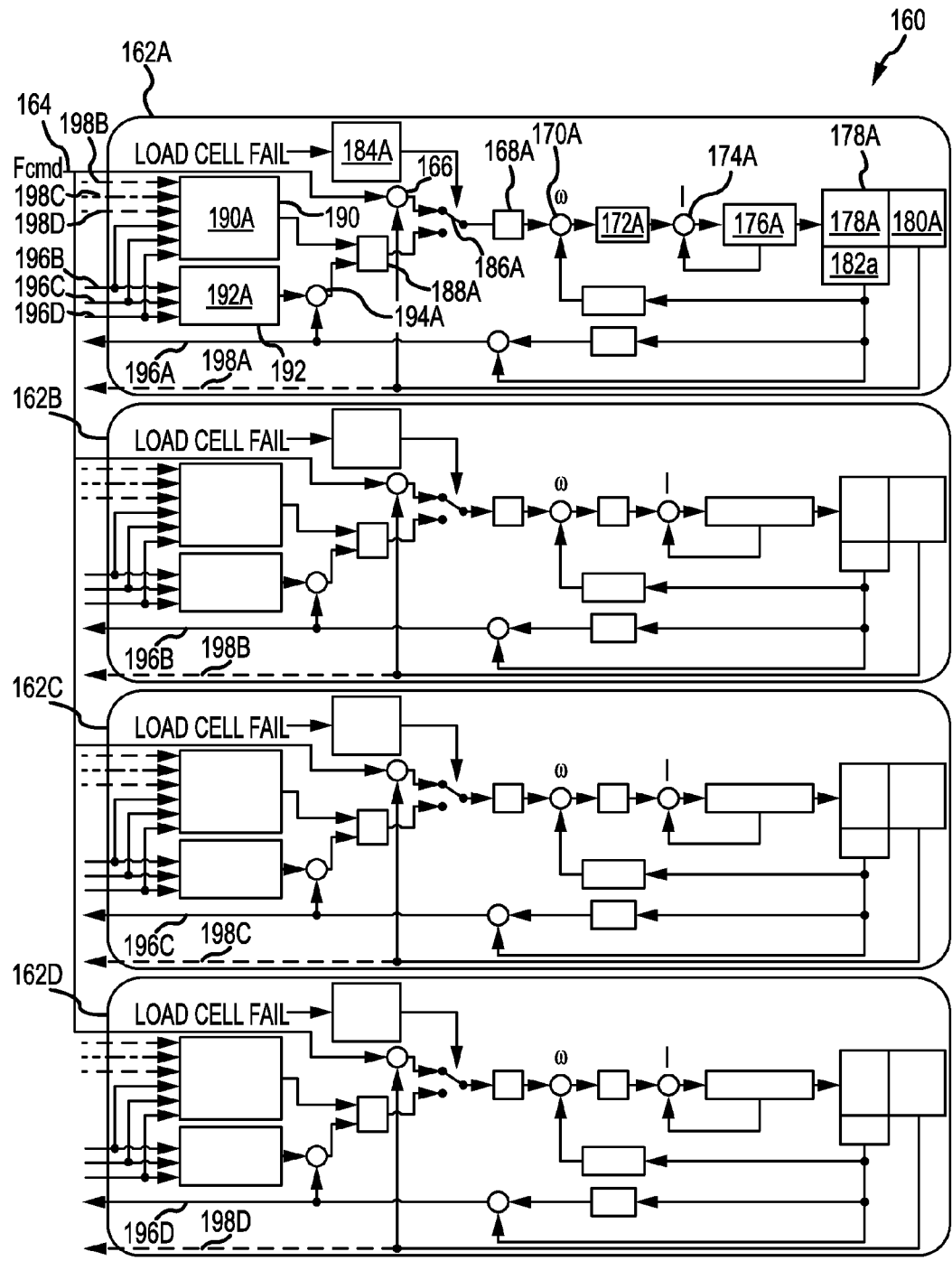
FIG. 4 illustrates a schematic diagram of a brake system having four electromechanical brake actuators, in accordance with various embodiments.

With reference to FIG. 4, a schematic diagram of a system 160 for operating multiple EBAs (identical to EBAs 112 of FIGS. 1-3) using force measurements from load cells is shown, in accordance with various embodiments. Circuits 162A, 162B, 162C, and 162D are shown with the details of circuits 162B through 162D omitted where duplicative of circuit 162A. A force command 164 may be distributed to each circuit 162A through 162D. Circuit 162A comprises a foundation box 166A logically coupled to switch 186A. Foundation box 166A provides input to a controller 168A when switch 186A is set to control EBA 178A using a load cell 180A located locally on EBA 178A. Controller 168A may comprise a controller algorithm to provide input into speed logic 170A, controller 172A, summation 174A, and inverter 176A. The output from inverter 176A may then operate EBA 178A. Load cell 180A may comprise a voltage drop indicative of the force in EBA 178A. Position sensor 182A may be a resolver or Hall Effect sensor array to detect the position of EBA 178A. Load cell 180A may provide force output 198A (i.e., a force measurement) that is sent outside of circuit 162A and used as a force input in circuits 162B through 162D. Position sensor 182A may then be manipulated to produce a ΔX output 196A representative of changing position of the EBA 178A.

In various embodiments, each circuit 162A through 162D may produce a similar ΔX output 196A, 196B, 196C and 196D and a similar force output 198A, 198B, 198C and 198D. Each circuit 162A through 162D may further comprise position circuitry to read and process the ΔX outputs 196A through 196D from external load cells (e.g., load cells in the other circuits 162A through 162D). For example, position circuitry 192A of circuit 162A may process the ΔX outputs 196B through 196D from circuits 162B through 162D. Similarly, each circuit 162A through 162D may further comprise force circuitry to read and process the force outputs 198A through 198D from external load cells. For example, force circuitry 190A of circuit 162A may process the force outputs 198B through 198D from load cells of circuits 162B through 162D. Force outputs 198A through 198D and ΔX outputs 196A through 198D may be communicated to other circuits by placing the signals on a data bus and/or wiring the outputs directly to the other circuits.

In various embodiments, switch logic 184A of circuit 162A may flip switch 186A in response to detection of a failed or faulty load cell 180A positioned locally in circuit 162A (i.e., load cell 180A used to command EBA 178A during normal operation). The switch may select the input into EBA 178A to originate from the force circuitry 190A and position circuitry 192A rather than local load cell 180A. In that regard, load cell 180A may not be read directly to determine force at EBA 178A. Instead a force may be estimated using force outputs and/or ΔX outputs from one or more of circuits 162B, 162C, and/or 162D. For example, force outputs 198B through 198D and ΔX output 196B through 196D may be used in circuit 162A to determine force when load cell 180A fails using a threshold value equal to the arithmetic mean of the force outputs of 198B, 198C, and 198D and comparing the mean value to the force measurement from load cell 180A. Force outputs 198B through 198D and ΔX outputs 196B through 196D may also be used in circuit 162A to determine force when load cell 180A fails by taking the median or mode of the force outputs of 198B, 198C, and 198D and comparing the median or mode to the force measurement from load cell 180A.

Figure 5:
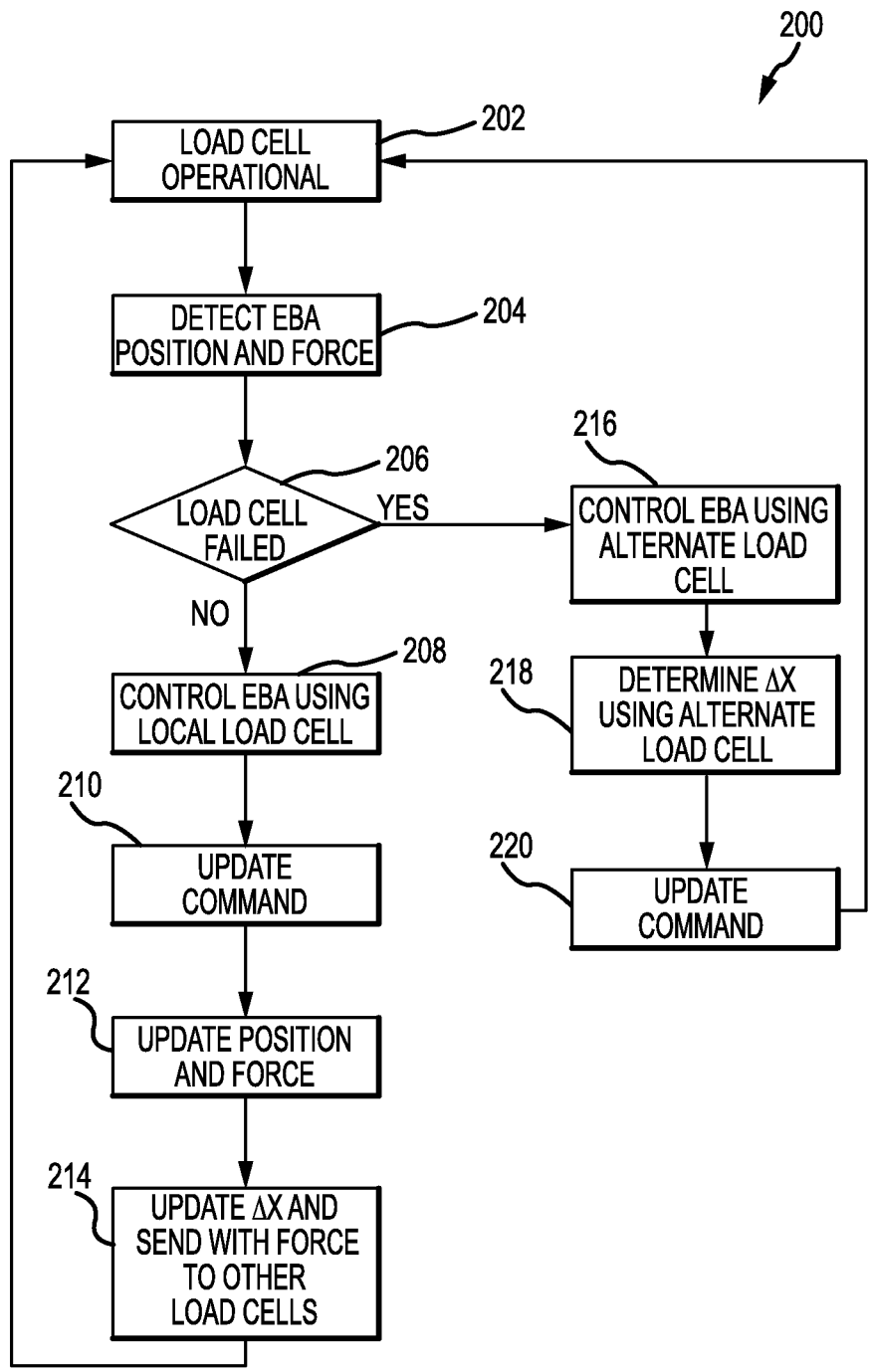
FIG. 5 illustrates a flow diagram for controlling an EBA having a failed load cell, in accordance with various embodiments.

With reference to FIGS. 4 and 5, a process 200 for switching between a local load cell control system and an external load cell control system is shown for execution on system 100 as illustrated in FIGS. 1-4, in accordance with various embodiments. The process may be carried out using a processor in at least one of EBAC 102 of FIG. 1 or EBA 178A of FIG. 4. System may have an operational load cell 180A in EBA 178A (Step 202). The system detects EBA 178A position and force (Step 204). The position may be detected using a position sensor (e.g., position sensor 182A of FIG. 4) disposed in EBA 178A. The force may be detected using load cell voltage (e.g., a voltage of load cell 180A in FIG. 4). The system may then check whether the load cell 180A has failed (Step 206). The check may be completed either in a logic or a digital signal processor housed within EBA 178A or remotely in EBAC 102.

In various embodiments, load cell 180A failure may be detected, at least in part, using the force output (e.g., force outputs 198B through 198D in FIG. 4) from other load cells by determining if load cell 180A is operating outside a predetermined range of a threshold value. For example, and with brief reference to FIG. 4, if load cell 180A of circuit 162A is operating with a voltage 10% higher or 10% lower than load cells 180B through 180D of circuits 162B through 162D, then the system may estimate that load cell 180A of circuit 162A is faulty or failed. Other ranges such as voltages 5%, 15%, and/or 20% outside a range of a threshold value, for example, may be used as the predetermined range to detect its respective subsystem.

In various embodiments, if the local load cell has not failed, the system may control the EBA 178A using the load cell 180A (Step 208). The system may then update the command for the EBA 178A (Step 210). The system may also update the position and force of the EBA 178A (Step 212). The system may then update its outputs and send the outputs to other load cells (Step 214). For example, and with brief reference to FIG. 4, load cell 180A may provide force output 198A and ΔX output 196A to circuits 162B through 162D.

In various embodiments, if the load cell 180A has failed then the switch logic 184A will flip switch 186A. In that regard, the system may control the EBA 178A using alternate load cell information (Step 216). Alternate load cell information may originate from a load cell external to EBA 178A. For example, in FIG. 4 the force output 198B through 198D may be used to control EBA 178A of circuit 162A. The system may then determine ΔX using alternate load cell information (Step 218). The system may further update the command to EBA 178A (Step 220). In that regard, the system may control a local EMA using input from other load cells on other EMAs. The system may thus prevent an EMA from disabling in response to a load cell failure. As a result, the system may also maintain braking distance reliably as well as closed loop control due to EBA uptime despite load cell failure.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A brake system comprising:
an electromechanical brake actuator controller (EBAC);
a first electromechanical brake actuator (EBA) electrically coupled to the EBAC, the first EBA comprising a first load cell;
a second EBA electrically coupled to the EBAC, the second EBA comprising a second load cell that outputs a force output;
a tangible, non-transitory memory configured to communicate with a controller of at least one of the first EBA or the EBAC, the tangible, non-transitory memory having instructions stored thereon that, in response to execution by the controller, cause the controller to perform operations comprising:
detecting, by the controller, a failure of the first load cell;
estimating, by the controller, a force of the first EBA using the force output from the second load cell; and
commanding, by the controller, the first EBA in response to the force output from the second load cell.

2. The brake system of claim 1, further comprising estimating, by the controller, the force of the first EBA using at least one of an average, a mode, or a median of a force output from the second load cell and a force output from a third load cell.

3. The brake system of claim 1, further comprising determining, by the controller, that a voltage of the first load cell is operating outside a predetermined range of a voltage of the second load cell.

4. The brake system of claim 3, wherein the predetermined range is 5% or less of the voltage of the second load cell.

5. The brake system of claim 1, further comprising receiving, by the controller, the force output from the second load cell on a data bus.

6. The brake system of claim 1, further comprising a brake stack having the first EBA configured to apply the force to the brake stack.

7. The brake system of claim 1, further comprising a circuit of the controller electrically coupled to the first EBA, the circuit comprising a position circuitry and a force circuitry.

8. The brake system of claim 7, further comprising a switch configured to select an input of the first EBA in response to the failure of the first load cell.

9. A method of controlling a brake system comprising:
detecting, by a controller, a failure of a first load cell of a first electromechanical brake actuator (EBA);
estimating, by the controller, a force output of the first EBA using a force output from a second load cell; and
commanding, by the controller, the first EBA in response to the estimated force output of the first EBA.

10. The method of claim 9, further comprising estimating, by the controller, the force output of the first EBA using the force output from the second load cell and a force output from a third load cell.

11. The method of claim 9, further comprising determining, by the controller, that a voltage of the first load cell is operating outside a predetermined range of a voltage of the second load cell.

12. The method of claim 11, wherein the predetermined range is 5% or less of the voltage of the second load cell.

13. The method of claim 9, further comprising selecting, by the controller, an input of the first EBA in response to the failure of the first load cell.

14. The method of claim 9, further comprising outputting, by the controller, the force output from the first load cell on a data bus.

15. The method of claim 9, further comprising flipping a switch configured to select an input of the first EBA in response to the failure of the first load cell.

16. A non-transitory medium having instructions stored thereon that, in response to execution by an electromechanical brake actuator controller (EBAC), cause the EBAC to perform operations comprising:
detecting, by the EBAC, a failure of a first load cell of a first electromechanical brake actuator (EBA);
estimating, by the EBAC, a force output of the first EBA using a force output from a second load cell; and
commanding, by the EBAC, the first EBA in response to the estimated force output of the first EBA.

17. The non-transitory medium of claim 16, wherein the operations further comprise estimating, by the EBAC, the force output of the first EBA using the force output from the second load cell and a force output from a third load cell.

18. The non-transitory medium of claim 16, wherein the operations further comprise determining, by the EBAC, that a voltage of the first load cell is operating outside a predetermined range of a voltage of the second load cell.

19. The non-transitory medium of claim 18, wherein the predetermined range is 5% or less of the voltage of the second load cell.

20. The non-transitory medium of claim 16, wherein the operations further comprise selecting, by the EBAC, an input of the first EBA in response to the failure of the first load cell.

* * * * *